United States Patent
Tarutani (10) Patent No.: US 10,059,808 B2
(45) Date of Patent: Aug. 28, 2018

(54) TIRE SKELETON AND TIRE

(71) Applicant: BRIDGESTONE CORPORATION, Chuo-ku, Tokyo (JP)

(72) Inventor: Yasunori Tarutani, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 15/515,138

(22) PCT Filed: Oct. 1, 2015

(86) PCT No.: PCT/JP2015/077965
§ 371 (c)(1),
(2) Date: Mar. 28, 2017

(87) PCT Pub. No.: WO2016/052705
PCT Pub. Date: Apr. 7, 2016

(65) Prior Publication Data
US 2017/0210858 A1    Jul. 27, 2017

(30) Foreign Application Priority Data

Oct. 1, 2014 (JP) .................. 2014-203500

(51) Int. Cl.
*C08G 81/00* (2006.01)
*B60C 1/00* (2006.01)

(52) U.S. Cl.
CPC ............ *C08G 81/00* (2013.01); *B60C 1/0041* (2013.01); *C08G 2380/00* (2013.01); *C08G 2650/02* (2013.01); *C08G 2650/50* (2013.01)

(58) Field of Classification Search
None
See application file for complete search history.

(56) References Cited

U.S. PATENT DOCUMENTS

| | | | |
|---|---|---|---|
| 3,944,629 A | 3/1976 | Hedrick et al. | |
| 4,017,557 A * | 4/1977 | Hammer | C08G 81/028 |
| | | | 525/183 |
| 5,254,668 A | 10/1993 | Dominguez et al. | |
| 2013/0059142 A1 | 3/2013 | Chung et al. | |
| 2013/0206301 A1 | 8/2013 | Fudemoto et al. | |
| 2015/0218731 A1 | 8/2015 | Mitadera et al. | |
| 2016/0303905 A1 | 10/2016 | Fudemoto et al. | |

FOREIGN PATENT DOCUMENTS

| | | |
|---|---|---|
| JP | S51-018797 A | 2/1976 |
| JP | S61-123631 A | 6/1986 |
| JP | S62-285920 A | 12/1987 |
| JP | 2011-042774 A | 3/2011 |
| JP | 2012-046030 A | 3/2012 |
| JP | 2013-528666 A | 7/2013 |
| JP | 2014-037642 A | 2/2014 |

OTHER PUBLICATIONS

International Search Report issued in International Application No. PCT/JP2015/077965 dated Dec. 8, 2015.
Extended European Search Report dated Jul. 13, 2017, issued in corresponding EP Patent Application EP 15845816.6.

* cited by examiner

*Primary Examiner* — Ana L. Woodward
(74) *Attorney, Agent, or Firm* — SOLARIS Intellectual Property Group, PLLC (57) ABSTRACT

A circular tire frame includes a resinous material including a polyamide-based thermoplastic elastomer. The polyamide-based thermoplastic elastomer is a copolymer formed by polymerization of at least a polymer (HS) forming a hard segment and a polymer (3SS) forming a soft segment and having three or more functional groups.

10 Claims, 4 Drawing Sheets

TIRE SKELETON AND TIRE

TECHNICAL FIELD

The present invention relates to a tire to be mounted on a rim and a tire frame used for the tire, and particularly relates to a tire in which at least a part of a tire frame (tire case) is made of a resinous material.

BACKGROUND ART

Pneumatic tires composed of, for example, rubber, an organic fiber material and a steel member have been used for vehicles such as passenger cars. Ordinary rubber materials used in tire frames of conventional pneumatic tires do not have problems in terms of heat resistance and the like. However, tire manufacturing processes therefor usually include plural processes including kneading, sheeting, shaping and vulcanization, and an improvement in productivity has been desired.

In view of the above, use of resin materials, particularly thermoplastic resins and thermoplastic elastomers, in tire materials, has been studied in recent years, considering that the resins have light weights, high shapability, and high recyclability. These thermoplastic polymer materials (thermoplastic resins) have a lot of advantages from the viewpoint of improving productivity, such as being injection moldable.

Further, a tire in which a polyamide-based thermoplastic elastomer is used as the thermoplastic polymer material is proposed in Japanese Patent Application Laid-open (JP-A) No. 2012-46030.

SUMMARY OF INVENTION

Problem to be Solved by Invention

Tires in which thermoplastic polymer materials are used can be manufactured more easily at lower cost than conventional tires made of rubber. Tires in which thermoplastic polymer materials are used are desired to be mountable on rims, and to have excellent fittability to rims such that internal air does not leak when the tires are mounted on rims, and, in addition, to achieve low rolling resistance (low-loss property).

An exemplary method for achieving a low-loss property while retaining fittability to a rim is a method in which the hard segment/soft segment ratio in the thermoplastic elastomer is controlled. However, fittability to a rim (elastic modulus) and a low-loss property have a trade-off relationship such that enhancement of one of the properties leads to deterioration of the other property, and it has been difficult to improve both of the properties.

In consideration of the above circumstance, the present invention aims to provide a tire frame that is formed using a resinous material, and that achieve both of excellent fittability to a rim and an excellent low-loss property.

Means for Solving Problem

[1] A circular tire frame including a resinous material including a polyamide-based thermoplastic elastomer, the polyamide-based thermoplastic elastomer being a copolymer formed by polymerization of at least a polymer (HS) forming a hard segment and a polymer (3SS) forming a soft segment and having three or more functional groups.

Advantageous Effect of Invention

According to the invention, a tire frame that is formed using a resinous material, and that achieve both of excellent fittability to a rim and an excellent low-loss property, can be provided.

MODES FOR CARRYING OUT INVENTION

A tire frame according to the invention is a tubular tire frame formed using a resinous material including a polyamide-based thermoplastic elastomer (i.e., formed using at least the resinous material). The polyamide-based thermoplastic elastomer is a copolymer formed by polymerization of at least a polymer (HS) forming a part or the whole of a hard segment and a polymer (3SS) forming a part or the whole of a soft segment and having three or more functional groups.

Here, the "polyamide-based thermoplastic elastomer" means a copolymeric thermoplastic resin material including:

a polymer forming a part or the whole of a hard segment, which is crystalline and has a high melting point; and a polymer forming a part or the whole of a soft segment, which is non-crystalline and has a low glass transition temperature, a main chain of the polymer forming a part or the whole of a hard segment including an amide bond (—CONH—).

The polyamide-based thermoplastic elastomer is sometimes simply referred to as a "TPA" (Thermoplastic Amid Elastomer).

In the polyamide-based thermoplastic elastomer (TPA) in the invention, the polymer forming a part or the whole of a soft segment has at least three or more functional groups, and a tire frame achieving both of excellent fittability to a rim and an excellent low-loss property can be obtained due to this configuration.

The reason why the effect can be achieved is not exactly clear. The use of a tri-functional or higher-functional polymer in a soft segment results in introduction of a branched structure of the soft segment into the polyamide-based thermoplastic elastomer. It is conceivable that the introduction of a branched structure leads to enhanced tangling of soft segment portions in non-crystalline moieties in the thermoplastic elastomer molecules. It is presumed that the enhanced tangling results in maintenance of an excellent low-loss property as well as improvement in elastic modulus, thereby also achieving excellent fittability to a rim.

Further enhanced tangling of soft segment portions in the crystalline moieties in the thermoplastic elastomer molecules also produces an effect with respect to decreasing the tan δ, which is a base of the loss.

Further, in the invention, an excellent strength against tension can be obtained due to the configuration in which the polymer forming a part or the whole of a soft segment at least has three or more functional groups, and this effect is more conspicuous when a tire frame is formed using injection molding, in particular. The reason why the effect is produced is not exactly clear, but it is conceivable that the absence of branching in a soft segment has, for example, a tendency that the elastomer becomes oriented in the injection direction at the time of injection molding, and that the strength against tension in a direction perpendicular to the injection direction decreases. In contrast, it is presumed that, in the invention, the presence of branching in a soft segment reduces the orientation in the injection direction, and also enhances tangling of soft segment portions in the non-crystalline moieties in the thermoplastic elastomer molecules. It is conceivable that these result in provision of an excellent strength against tension also in a direction perpendicular to the injection direction.

<<Resinous Material>>

The tire frame according to the invention is a tubular tire frame formed using a resinous material including a polyamide-based thermoplastic elastomer (TPA) (i.e., formed using at least the resinous material). The polyamide-based thermoplastic elastomer (hereinafter sometimes simply referred to as the "polyamide-based thermoplastic elastomer according to the invention") is a copolymer formed by polymerization of at least a polymer (HS) forming a part or the whole of a hard segment and a polymer (3SS) forming a part or the whole of a soft segment and having three or more functional groups.

The resinous material may include other thermoplastic elastomers than the polyamide-based thermoplastic elastomer, and other desired components. The content of the polyamide-based thermoplastic elastomer according to the invention with respect to the total amount of the resinous material is preferably 30% by mass or more, more preferably 50% by mass or more, and particularly preferably 70% by mass or more. In the present specification, the scope of the term "resin" encompasses thermoplastic resins and thermosetting resins, but does not include natural rubber.

(Polyamide-Based Thermoplastic Elastomer)

As described above, the polyamide-based thermoplastic elastomer (TPA) according to the invention may be a material including at least:

a polyamide forming a part or the whole of a hard segment, which is crystalline and has high melting point; and another polymer (for example, a polyester or a polyether) forming a part or the whole of a soft segment, which is non-crystalline and has a low glass transition temperature.

The polyamide-based thermoplastic elastomer may include a connection portion that is formed using a chain extender such as a dicarboxylic acid, and that connects a hard segment and a soft segment.

—Hard Segment—

The polyamide forming a part or the whole of a hard segment is, for example, a polyamide synthesized using a monomer represented by the following Formula (1) or Formula (2).

$$H_2N-R^1-COOH \qquad \text{Formula (1):}$$

In Formula (1), $R^1$ represents a hydrocarbon molecular chain having from 2 to 20 carbon atoms (for example, an alkylene group having from 2 to 20 carbon atoms).

Formula (2)

In Formula (2), $R^2$ represents a hydrocarbon molecular chain having from 3 to 20 carbon atoms (for example, an alkylene group having from 3 to 20 carbon atoms).

In Formula (1), $R^1$ is preferably a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms). In Formula (2), $R^2$ is preferably a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms).

Examples of monomers represented by the above Formula (1) or Formula (2) include an ω-aminocarboxylic acid, and a lactam. Examples of the polyamide that forms a part or the whole of a hard segment include a polycondensate of an ω-aminocarboxylic acid, a polycondensate of a lactam, and a co-polycondensate of a diamine and a dicarboxylic acid.

Examples of the ω-aminocarboxylic acid include an aliphatic ω-aminocarboxylic acid having from 5 to 20 carbon atoms, such as 6-aminocaproic acid, 7-aminoheptanoic acid, 8-aminooctanoic acid, 10-aminocapric acid, 11-aminoundecanoic acid, or 12-aminododecanoic acid. Examples of the lactam include an aliphatic lactam having from 5 to 20 carbon atoms, such as lauryllactam, ε-caprolactam, undecanelactam, ω-enantholactam, or 2-pyrrolidone.

Examples of the diamine include diamine compounds such as an aliphatic diamine having from 2 to 20 carbon atoms, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine or metaxylenediamine. The dicarboxylic acid may be represented by HOOC—$(R^3)_m$—COOH, wherein $R^3$ represents a hydrocarbon molecular chain having from 3 to 20 carbon atoms, and m represents 0 or 1. Examples of the dicarboxylic acid include an aliphatic dicarboxylic acid having from 2 to 22 carbon atoms, such as oxalic acid, succinic acid, glutaric acid, adipic acid, pimelic acid, suberic acid, azelaic acid, sebacic acid, or dodecanedioic acid.

Examples of the polyamide that forms a part or the whole of a hard segment include a polyamide (polyamide 6) obtained by ring-opening polycondensation of ε-caprolactam, a polyamide (polyamide 11) obtained by ring-opening polycondensation of undecanelactam, a polyamide (polyamide 12) obtained by ring-opening polycondensation of lauryllactam, a polyamide (polyamide 12) obtained by polycondensation of 12-aminododecanoic acid, a polycondensate polyamide of a diamine and a dibasic acid (for example, a polyamide (polyamide 66) obtained by polycondensation of hexamethylenediamine and adipic acid, or a polyamide (polyamide 612) obtained by polycondensation of hexamethylenediamine and docecanedioic acid), or a polyamide (amide MX) including metaxylenediamine as a structural unit.

Among them, polyamide 6, polyamide 12 and polyamide 612 are preferable in view of the balance among injection moldability, fittability to a rim, a low-loss property, resistance to crack development and weather resistance.

Polyamide 6 can be expressed by, for example, {CO—$(CH_2)_5$—NH}$_n$, wherein n represents the number of repeating units, which may be freely set. Here, n is preferably from 2 to 100, and more preferably from 3 to 50.

Polyamide 11 can be expressed by, for example, {CO—$(CH_2)_{10}$—NH}$_n$, wherein n represents the number of repeating units, which may be freely set. Here, n is preferably from 2 to 100, and more preferably from 3 to 50.

Polyamide 12 can be expressed by, for example, {CO—$(CH_2)_{11}$—NH}$_n$, wherein n represents the number of repeating units, which may be freely set. Here, n is preferably from 2 to 100, and more preferably from 3 to 50.

Polyamide 66 can be expressed by, for example, {CO$(CH_2)_4$CONH$(CH_2)_6$NH}$_n$, wherein n represents the number of repeating units, which may be freely set. Here, n is preferably from 2 to 100, and more preferably from 3 to 50.

Polyamide 612 can be expressed by, for example, {CO$(CH_2)_{10}$CONH$(CH_2)_6$NH}$_n$, wherein n represents the number of repeating units, which may be freely set. Here, n is preferably from 2 to 100, and more preferably from 3 to 50.

Amide MX, which includes metaxylenediamine as a structural unit, can be represented by, for example, the following structural unit (A-1), wherein n in (A-1) represents the number of repeating units, which may be freely set. Here, n is preferably from 2 to 100, and more preferably from 3 to 50.

(A-1)

The polyamide-based thermoplastic elastomer preferably includes a polyamide (polyamide 6) having a unit structure represented by —[CO—$(CH_2)_5$—NH]—, or a polyamide (polyamide 12) having a unit structure represented by —[CO—$(CH_2)_{11}$—NH]—, as a hard segment.

—Soft Segment—

(Polymer (3SS) Having Three or More Functional Groups for Soft Segment)

At least a polymer (3SS) having three or more functional groups is used as a polymer forming a part or the whole of a soft segment.

The functional groups of the polymer (3SS) are not particularly limited, as long as the functional groups contribute to polymerization in the polyamide-based thermoplastic elastomer. Specific examples thereof include an amino group, a carboxy group or a hydroxyl group.

Examples of the polymer (3SS) having three or more functional groups include trifunctional or higher-functional polyesters and polyethers. Examples include polyethers and polyesters, such as polyethylene polyols, polypropylene polyols, polytetramethylene ether polyols, and polyester polyols. These may be used singly, or in combination of two or more thereof.

Examples of polymers that can be used as the polymer (3SS) further include polyether amines having three or more amino groups and polyether carboxylic acids having three or more carboxyl groups, which are obtained by allowing, for example, ammonia or a carboxylic acid to react with terminals of polyethers, and polyether polyols having three or more hydroxyl groups.

An example of a polyether amine having three amino groups is a trifunctional polyether amine obtained by allowing ammonia to react with terminals of polypropylene triol, and a specific example thereof is a polyether amine represented by the following Formula (SS3-1).

(SS3-1)

In Formula (SS3-1), R represents a linear alkyl group or a hydrogen atom (preferably a linear alkyl group having from 1 to 2 carbon atoms or a hydrogen atom, and more preferably $C_2H_5$ or a hydrogen atom), n represents 0 or 1, and x, y and z represents integers, provided that x+y+z is from 5 to 85.

Specific examples of polyether amines having three amino groups include JEFFAMINE (registered trademark) T-403, T-3000 or T-5000 manufactured by HUNTSMAN.

Examples of polyether amines having four or more amino groups include XTJ-616 manufactured by HUNTSMAN.

Specific examples of polyether polyols having three or more hydroxyl groups include PLACCEL 300 series manufactured by DAICEL Corporation, and EXCENOL or PREMINOL manufactured by Asahi Glass Co., Ltd.

The functional groups of the trifunctional or higher-functional polymer (3SS) for a soft segment are more preferably amino groups or carboxyl groups from the viewpoint of providing excellent weather resistance (resistance to hydrolysis).

The polyamide-based thermoplastic elastomer according to the invention may include a polymer (2SS) having two functional groups as a soft segment. In the polyamide-based thermoplastic elastomer, the proportion of the tri- or higher-functional polymer (3SS) for a soft segment to the total amount of the tri- or higher-functional polymer (3SS) for a soft segment and the bifunctional polymer (2SS) for a soft segment is preferably from 1% by mol to 30% by mol, more preferably from 5% by mol to 25% by mol, and still more preferably from 10% by mol to 20% by mol.

When the proportion of the tri- or higher-functional polymer (3SS) for a soft segment is 1% by mol or more, the balance between excellent fittability to a rim and an excellent low-loss property can more effectively be achieved. In addition, when the proportion is 30% by mol or less, the viscosity is not excessively high, and particularly superior injection moldability can be realized.

(Polymer (2SS) Having Two Functional Groups for Soft Segment)

Examples of the polymer (2SS) having two functional groups and forming a part of soft segments include bifunctional polyesters and polyethers. Examples include a polyether or polyester such as polyethylene glycol, polypropylene glycol (PPG), polytetramethylene ether glycol (PTMG), or a polyester polyol, or an ABA-type triblock polyether diol. These may be used singly or in combination of two or more thereof. For example, a polyether diamine obtained by allowing, for example, ammonia to react with terminals of a polyether may be used, and, for example, an ABA-type triblock polyether diamine may be used.

Here, the "ABA-type triblock polyether diol" refers to a polyether represented by the following Formula (3).

Formula (3)

In Formula (3), each of x and z independently represents an integer from 1 to 20, and y represents an integer from 4 to 50.

In Formula (3), each of x and z is preferably an integer from 1 to 18, more preferably an integer from 1 to 16, particularly preferably an integer from 1 to 14, and most preferably an integer from 1 to 12. In Formula (3), y is preferably an integer from 5 to 45, more preferably an integer from 6 to 40, particularly preferably an integer from 7 to 35, and most preferably an integer from 8 to 30.

The "ABA-type triblock polyether diamine" may be a polyether diamine represented by the following Formula (N).

Formula (N)

In Formula (N), each of $X_N$ and $Z_N$ independently represents an integer from 1 to 20, and $Y_N$ represents an integer from 4 to 50.

In Formula (N), each of $X_N$ and $Z_N$ is preferably an integer from 1 to 18, more preferably an integer from 1 to 16, particularly preferably an integer from 1 to 14, and most preferably an integer from 1 to 12. In Formula (N), $Y_N$ is preferably an integer from 5 to 45, more preferably an integer from 6 to 40, particularly preferably an integer from 7 to 35, and most preferably an integer from 8 to 30.

The combination of a hard segment and a soft segment (a bifunctional polymer, and a tri- or higher-functional polymer) is, for example, a combination of any of the above examples of a hard segment and any of the above examples of a soft segment. Among them, the combination of a hard segment and a soft segment is preferably a combination of a ring-opening polycondensate of lauryllactam, polyethylene glycol and a polyethylene polyol, a combination of a ring-opening polycondensate of lauryllactam, polypropylene glycol and a polypropylene polyol, a combination of a ring-opening polycondensate of lauryllactam, polytetramethylene ether glycol and polytetramethylene ether polyol, a combination of a ring-opening polycondensate of lauryllactam, an ABA-type triblock polyether diol and polypropylene polyol, a combination of a polycondensate of aminododecanoic acid, polyethylene glycol and a polyethylene polyol, a combination of a polycondensate of aminododecanoic acid, polypropylene glycol and a polypropylene polyol, a combination of a polycondensate of aminododecanoic acid, polytetramethylene ether glycol and polytetramethylene ether polyol, or a combination of a polycondensate of aminododecanoic acid, an ABA-type triblock polyether diol and polypropylene polyol.

A combination of a ring-opening polycondensate of ε-caprolactam, polypropylene glycol and polypropylene polyol, or a combination of a ring-opening polycondensate of ε-caprolactam, an ABA-type triblock polyether diol and polypropylene polyol, is particularly preferable.

The polymer forming a part or the whole of a soft segment may include a diamine, such as a branched saturated diamine having from 6 to 22 carbon atoms, a branched alicyclic diamine having from 6 to 16 carbon atoms or norbornane diamine, as a monomer unit. A branched saturated diamine having from 6 to 22 carbon atoms, a branched alicyclic diamine having from 6 to 16 carbon atoms and norbornane diamine may be used singly, or in combination of two or more thereof. These diamines are preferably used in combination with the ABA-type triblock polyether diol described above.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane and 2-methyl-1,8-diaminooctane.

Examples of the branched alicyclic diamine having from 6 to 16 carbon atoms include 5-amino-2,2,4-trimethyl-1-cyclopentane methyl amine and 5-amino-1,3,3-trimethylcyclohexane methyl amine. Each of these diamines may be in the cis-form or the trans-form, or a mixture of these isomers.

Examples of the norbornane diamine include 2,5-norbornane dimethyl amine, 2,6-norbornane dimethyl amine, or a mixture thereof.

The polymer forming a part or the whole of a soft segment may include other diamine compounds than those described above, as monomer units. Examples of other diamine compounds include an aliphatic diamine such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, or 3-methylpentamethylene diamine, an alicyclic diamine such as bis(4-aminocyclohexyl)methane, bis(4-aminocyclohexyl)propane, 1,3-bisaminomethylcyclohexane or 1,4-bisaminomethylcyclohexane, or an aromatic diamine such as metaxylylenediamine or paraxylylenediamine.

These diamines may be used singly, or in combination of two or more thereof, as appropriate.

—Chain Extender—

As described above, a chain extender, such as a dicarboxylic acid, may be used in the polyamide-based thermoplastic elastomer, in addition to a hard segment and a soft segment. As the dicarboxylic acid, at least one selected from aliphatic dicarboxylic acids, alicyclic dicarboxylic acids and aromatic dicarboxylic acids, or a derivative thereof, may be used.

Examples of the dicarboxylic acid include: aliphatic dicarboxylic acids including a linear aliphatic dicarboxylic acid having from 2 to 25 carbon atoms, such as adipic acid, decane dicarboxylic acid, oxalic acid, succinic acid, glutaric acid, pimelic acid, suberic acid, azelaic acid, sebacic acid, or dodecanedioic acid, a dimerized aliphatic dicarboxylic acid having from 14 to 48 carbon atoms that is a dimerized unsaturated fatty acid obtained by fractional distillation of a triglyceride, and hydrogenated products these dicarboxylic acid; alicyclic dicarboxylic acids such as 1,4-cyclohexane dicarboxylic acid; and aromatic dicarboxylic acids such as terephthalic acid and isophthalic acid.

(HS Mass Ratio)

In the polyamide-based thermoplastic elastomer according to the invention, the mass ratio (HS/SS) of hard segment to soft segment is preferably in the range of from 45/55 to 80/20. When the HS mass ratio is equal to or higher than the lower limit, the elastic modulus is high, and the shape maintainability and fittability to a rim are obtained. When the HS mass ratio is equal to or lower than the upper limit, the elastic modulus is not excessively high, and fittability to a rim is obtained. The HS mass ratio can be adjusted to a desired range by adjusting the charge amounts of raw materials for forming a hard segment and the charge amounts of raw materials for forming a soft segment. The HS mass ratio in the polyamide-based thermoplastic elastomer can be measured using $^1$H-NMR and $^{13}$C-NMR.

The contents of hard segment and soft segment in the polyamide-based thermoplastic elastomer is preferably set, as appropriate, such that the HS mass ratio is in the above-described range. When the chain extender is used, the content of the chain extender is preferably set such that the hydroxyl groups or amino groups of the monomer(s) serving as the raw material for a soft segment are approximately equimolar to the carboxyl groups of the chain extender.

The contents of hard segment, soft segment and optional chain extender in the polyamide-based thermoplastic elastomer are appropriately set so that the HS mass ratio is in the above-described range. For example, desired contents for the respective moieties can be obtained by adjusting the charge amounts for the respective moieties.

—Molecular Weight—

In the invention, the weight average molecular weight of the polyamide-based thermoplastic elastomer contained in the resinous material is not particularly limited, and is preferably from 10,000 to 700,000. When the weight average molecular weight is 700,000 or less, favorable injection moldability can more easily be maintained. When the weight average molecular weight is 10,000 or more, pressure resistance can sufficiently be ensured. The weight average molecular weight is more preferably from 10,000 to 400,000. From the viewpoints of further improving the fittability to a rim and improving the pressure resistance against the internal pressure of a tire, the weight average molecular weight of the polyamide-based thermoplastic elastomer is still more preferably from 15,700 to 300,000, and particularly preferably from 22,000 to 200,000.

The ratio (Mw80/Mw20) of the molecular weight at 80% cumulative weight (Mw80) to the molecular weight at 20% cumulative weight (Mw20) in the polyamide-based thermoplastic elastomer is preferably in the range of from 3 to 20, more preferably in the range of from 4 to 15, and still more preferably in the range of from 5 to 12.

When the ratio (Mw80/Mw20) is equal to or higher than the lower limit indicated above, an effect with respect to achievement of an excellent low-loss property and an excellent resistance to crack development can be obtained. When the ratio is equal to or lower than the upper limit specified above, an effect with respect to achievement of excellent injection moldability can be obtained.

The weight average molecular weight of the polyamide-based thermoplastic elastomer can be measured using gel permeation chromatography (GPC), and GPC (gel permeation chromatography) such as a HLC-8320GPC EcoSEC manufactured by Tosoh Corporation may be used. In the measurement values obtained using the GPC, the molecular weight at 20% cumulative weight (Mw20) refers to the molecular weight at which the cumulative weight accumulated from the smaller weight side becomes 20%, and the molecular weight at 80% cumulative weight (Mw80) refers to the molecular weight at which the cumulative weight accumulated from the smaller weight side becomes 80%.

The number average molecular weight of the polymer (polyamide) forming a part or the whole of a hard segment is preferably from 300 to 15,000 from the viewpoint of melt moldability. The number average molecular weight of the polymer forming a part or the whole of a soft segment is preferably from 200 to 6000 from the viewpoints of toughness and low-temperature flexibility.

The polyamide-based thermoplastic elastomer can be synthesized by copolymerizing a polymer forming a part or the whole of a hard segment and a polymer forming a part or the whole of a soft segment, using known methods. For example, the polyamide-based thermoplastic elastomer may be obtained by polymerizing, in a container, a monomer serving as a raw material for forming a hard segment (for example, an ω-aminocarboxylic acid such as 12-aminododecanoic acid, or a lactam such as lauryllactam), a monomer serving as a raw material for forming a trifunctional soft segment (for example, a trifunctional polyether amine), a monomer serving as a raw material for forming a bifunctional soft segment (for example, the ABA-type triblock polyether amine) and a chain extender (for example, adipic acid or decanedicarboxylic acid). In particular, when an ω-aminocarboxylic acid is used as a monomer serving as a raw material for forming a hard segment, the polyamide-based thermoplastic elastomer may be synthesized by performing normal pressure melt polymerization, or further performing reduced-pressure melt polymerization in addition to normal pressure melt polymerization. When a lactam is used as a monomer serving as a raw material for forming a hard segment, an appropriate amount of water may also be present, and the polyamide-based thermoplastic elastomer may be produced by a method including melt polymerization under an elevated pressure that is 0.1 to 5 MPa above normal pressure, and subsequent normal pressure melt polymerization and/or reduced pressure melt polymerization. These synthesis methods may be performed in either a batch manner or a continuous manner. In order to perform the synthesis reaction, a batch reaction tank, a mono-tank or multi-tank continuous reaction apparatus, a tubular continuous reaction apparatus, and the like may be used singly or in an appropriate combination of two or more thereof.

In the production of the polyamide-based thermoplastic elastomer, the polymerization temperature is preferably from 150° C. to 300° C., and more preferably from 160° C. to 280° C. The polymerization time may appropriately be set in relation to the polymerization average molecular weight of the polyamide-based thermoplastic elastomer to be synthesized, and the polymerization temperature. For example, the polymerization time is preferably from 0.5 to 30 hours, and more preferably from 0.5 to 20 hours.

In the production of the polyamide-based thermoplastic elastomer, additives may be added, as necessary, in order to adjust the molecular weight or stabilize the melt viscosity at the time of shaping, and examples of additives include monoamins or diamines such as laurylamine, stearylamine, hexamethylenediamine, and metaxylylenediamine, and monocarboxylic acids or dicarboxylic acids such as acetic acid, benzoic acid, stearic acid, adipic acid, sebacic acid and dodecanedioic acid. Additives may be selected, as appropriate, in consideration of the molecular weight and viscosity of the polyamide-based thermoplastic elastomer to be obtained, provided that the additives should not adversely affect the effect according to the invention.

In the production of the polyamide-based thermoplastic elastomer, catalysts may be used, as necessary. The catalyst may be, for example, a compound containing at least one selected from the group consisting of P, Ti, Ge, Zn, Fe, Sn, Mn, Co, Zr, V, Ir, La, Ce, Li, Ca and Hf.

For example, examples include inorganic phosphorus compounds, organic titanium compounds, organic zirconium compounds and organic tin compounds. Specifically, examples of inorganic phosphorus compounds include: phosphorus-containing acids such as phosphoric acid, pyrophosphoric acid, polyphosphoric acid, phosphorous acid and hypophosphorous acid; alkali metal salts of phosphorus-containing acids; or alkaline earth metal salts of phosphorus-containing acids.

Examples or organic titanium compounds include titanium alkoxides (such as titanium tetrabutoxide or titanium tetraisopropoxide).

Examples of organic zirconium compounds include zirconium alkoxides (such as zirconium tetrabutoxide (also indicated as "$Zr(OBu)_4$" or "$Zr(OC_4H_8)_4$")).

Examples of organic tin compounds include distannoxane compounds (such as 1-hydroxy-3-isothiocyanate-1,1,3,3-tetrabutyldistannoxane), tin acetate, dibutyltin dilaurate, or butyltin hydroxide oxide hydrate.

The amount of the catalyst to be added and the timing of addition of the catalyst are not particularly limited as long as the desired product can be obtained quickly.

The resinous material may include various additives, as desired, such as rubber, various fillers (for example, silica, calcium carbonate, or clay), anti-aging agents, oils, plasticizers, colorants, weather resistance agents and reinforcing agents. The contents of the additives in the resinous material (tire frame) are not particularly limited, and the additives may be used, as appropriate, in a range in which the effect according to the invention is not impaired. When non-resinous components, such as additives, are added to the resinous material, the content of resin component in the resinous material is preferably 50% by mass or more, and more preferably 90% by mass or more, with respect to the total amount of the resinous material. The content of resin component in the resinous material is the balance remaining after subtracting the total content of the various additives from the total amount of the resin components.

(Physical Properties of Resinous Material)

Next, preferable physical properties of the resinous material forming a part or the whole of the tire frame will be described. The tire frame according to the invention is formed using the resinous material.

The melting point (or softening point) of the resinous material (tire frame) is ordinarily from 100° C. to 350° C., and preferably approximately from 100° C. to 250° C. From the viewpoint of tire productivity, the melting point (softening point) is preferably approximately from 120° C. to 250° C., and more preferably from 120° C. to 200° C.

When, for example, a tire frame is formed by fusing divided parts (frame pieces) of the tire frame, use of a resinous material having a melting point of 120° C. to 250° C. provides a sufficient adhesive strength between tire frame pieces in a frame formed by fusing at a surrounding temperature of 120° C. to 250° C. Therefore, the tire according to the invention has excellent durability at running, such as puncture resistance or wear resistance. The heating temperature described above is preferably a temperature that is 10° C. to 150° C. higher than the melting point (or softening point) of the resinous material forming a part or the whole of the tire frame, and more preferably a temperature that is 10° C. to 100° C. higher than the melting point (or softening point) of the resinous material forming a part or the whole of the tire frame.

The resinous material can be obtained by adding various additives, if necessary, and appropriately mixing the ingredients using a known method (for example, melt mixing). The resinous material obtained by melt mixing may be shaped into pellets, if necessary, and used.

The tensile strength at yield as defined in Japanese Industrial Standards (JIS) K7113:1995 of the resinous material (tire frame) itself is preferably 5 MPa or more, more preferably from 5 MPa to 20 MPa, and still more preferably from 5 MPa to 17 MPa. When the tensile strength at yield of the resinous material is 5 MPa or more, the resinous material can endure deformation due to a load applied to the tire at, for example, running.

The tensile elongation at yield as defined in JIS K7113:1995 of the resinous material (tire frame) itself is preferably 10% or more, more preferably from 10% to 70%, and still more preferably from 15% to 60%. When the tensile elongation at yield of the resinous material is 10% or more, the elastic range is large, and fittability to a rim can be improved.

The tensile elongation at break as defined in JIS K7113:1995 of the resinous material (tire frame) itself is preferably 50% or more, preferably 100% or more, still more preferably 150% or more, and particularly preferably 200% or more. When the tensile elongation at break of the resinous material is 50% or more, fittability to a rim is excellent, and the tire is resistant to breakage upon impact.

The deflection temperature under load as defined in ISO75-2 or ASTM D648 of the resinous material (tire frame) itself (under a load of 0.45 MPa) is preferably 50° C. or higher, preferably from 50° C. to 150° C., and more preferably from 50° C. to 130° C. When the deflection temperature under load of the resinous material is 50° C. or higher, deformation of the tire frame can be reduced even when vulcanization is performed in tire production.

First Embodiment

Figure 1A:
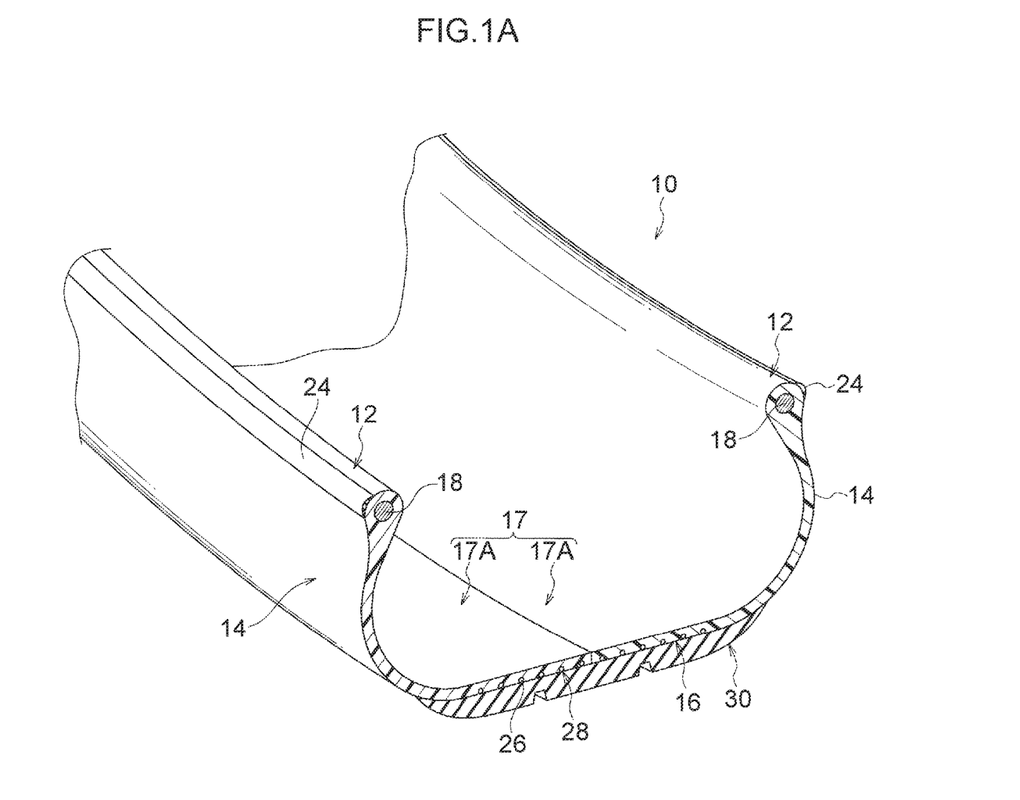
FIG. 1A is a perspective view illustrating a cross-section of a part of a tire according to one embodiment of the invention.
Figure 1B:
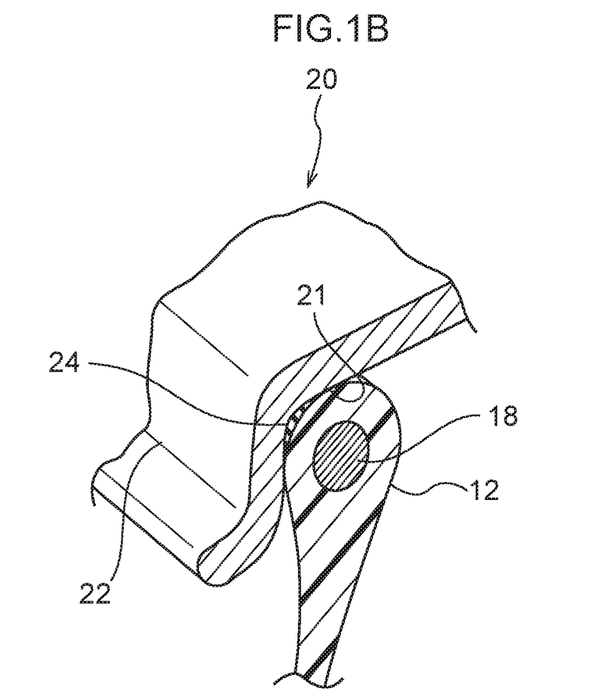
FIG. 1B is a cross-sectional view of a bead part mounted on a rim in a tire according to one embodiment of the invention.

A tire according to a first embodiment of the tire according to the invention is described below with reference to drawings. A tire 10 according to this embodiment is described below. FIG. 1A is a perspective view illustrating a cross-section of a part of a tire according to one embodiment of the invention, and FIG. 1B is a cross-sectional view of a bead portion mounted on a rim. As illustrated in FIG. 1, the tire 10 according to the present embodiment has a cross-sectional shape that is substantially similar to those of conventional ordinary pneumatic rubber tires.

As illustrated in FIG. 1A, the tire 10 includes a tire case 17 that includes: a pair of bead portions 12 that contact a bead sheet portion 21 and a rim flange 22 of a rim 20 illustrated in FIG. 1B; side portions 14 that each outwardly extend from a bead portion 12 in the tire radial direction; and a crown portion 16 (outer circumferential portion) that connects the tire-radial-direction outer end of one side portion 14 and the tire-radial-direction outer end of the other side portion 14.

In the tire case 17 according to the present embodiment, a resinous material including a polyamide-based thermoplastic elastomer that is a copolymer obtained by polymerization of at least a polymer (HS) forming a hard segment and a polymer (3SS) having three or more functional groups and forming a soft segment may be used.

Although the tire case 17 is made of a single resinous material in the present embodiment, the invention is not limited to this configuration, and thermoplastic resin materials having different properties may be used for the respective parts of the tire case 17 (for example, side portions 14, a crown portion 16 and bead portions 12), similar to conventional ordinary pneumatic rubber tires. Further, a reinforcing member (for example, a polymer or metal fiber, cord, non-woven fabric, or woven fabric) may be embedded in the tire case 17 (for example, in the bead portions 12, in the side portions 14 or in the crown portion 16), so as to reinforce the tire case 17 with the reinforcing member.

The tire case 17 according to the present embodiment is a member obtained by joining together a pair of tire case half parts (tire frame pieces) 17A formed only of a resinous material. Each tire case half part 17A is formed by producing an integrated body composed of one bead portion 12, one side portion 14 and a half-width part of the crown portion 16 by molding such as injection molding. The tire case 17 is formed by disposing the formed tire case half parts 17A, which have the same annular shape, to face to each other, and joining them together at the tire equatorial plane. The tire case 17 is not limited to those obtained by joining together two members, and may be formed by joining together three or more members.

Each of the tire case half parts 17A formed using at least the above-described resinous material may be shaped using, for example, vacuum molding, pressure forming, injection molding or melt casting. Therefore, vulcanization is unnecessary, the production process can greatly be simplified, and the forming time can be saved, as compared to the case of forming a tire case with rubber as in conventional techniques.

In the present embodiment, the tire case half parts 17A have a bilaterally symmetric shape, i.e., one of the tire case half parts 17A has the same shape as the other tire case half part 17A. Therefore, there is also an advantage in that only one type of mold is required for forming the tire case half parts 17A.

In the present embodiment, an annular bead core 18 made only of a steel cord similar to those used in conventional ordinary pneumatic tires is embedded in each of the bead portions 12, as illustrated in FIG. 1B. However, the invention is not limited to this configuration, and the bead core 18 may be omitted as long as it is ensured that the bead portion 12 has rigidity, and mounting on the rim 20 can be performed successfully. The bead core 18 may alternatively be formed using, for example, an organic fiber cord, a resin-coated organic fiber cord, or a hard resin, instead of a steel cord.

In the present embodiment, an annular sealing layer 24 formed of a material (for example, rubber) having a higher sealing property than that of the resinous material forming a part or the whole of the tire case 17 is provided on a part of the bead portion 12 that contacts the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resinous material that forms a part or the whole of the tire case 17 may be used as the material having a higher sealing property than that of the resinous material that forms a part or the whole of the tire case 17. As rubbers usable for the sealing layer 24, the same types of rubbers as the rubbers used on the outer surfaces of the bead portions of conventional ordinary pneumatic rubber tires are preferably used. Another thermoplastic resin (thermoplastic elastomer) having a higher sealing property than that of the resinous material may be used. Examples of another thermoplastic resin include a polyurethane-based resin, a polyolefin-based resin, a polystyrene-based thermoplastic resin, or a polyester resin, or a blend of any of these resins with a rubber or an elastomer. It is also possible to use a thermoplastic elastomer, such as a polyester-based thermoplastic elastomer, a polyurethane-based thermoplastic elastomer, a polystyrene-based thermoplastic elastomer, a polyolefin-based thermoplastic elastomer, or a combination of two or more of these elastomers or a blend of any of these elastomers with a rubber.

As illustrated in FIG. 1, a reinforcing cord 26 having a higher rigidity than that of the resinous material forming a part or the whole of the tire case 17 is wound around the crown portion 16 in the circumferential direction of the tire case 17. The reinforcing cord 26 is helically wound to form a reinforcing cord layer 28 in a state in which at least a part of the reinforcing cord 26 is embedded in the crown portion 16 in cross-sectional view taken along the axial direction of tire case 17. A crown 30 formed of a material (for example, rubber) having a higher wear resistance than that of the resinous material forming a part or the whole of the tire case 17 is disposed at the tire-radial-direction outer circumferential side of the reinforcing cord layer 28.

Figure 2:
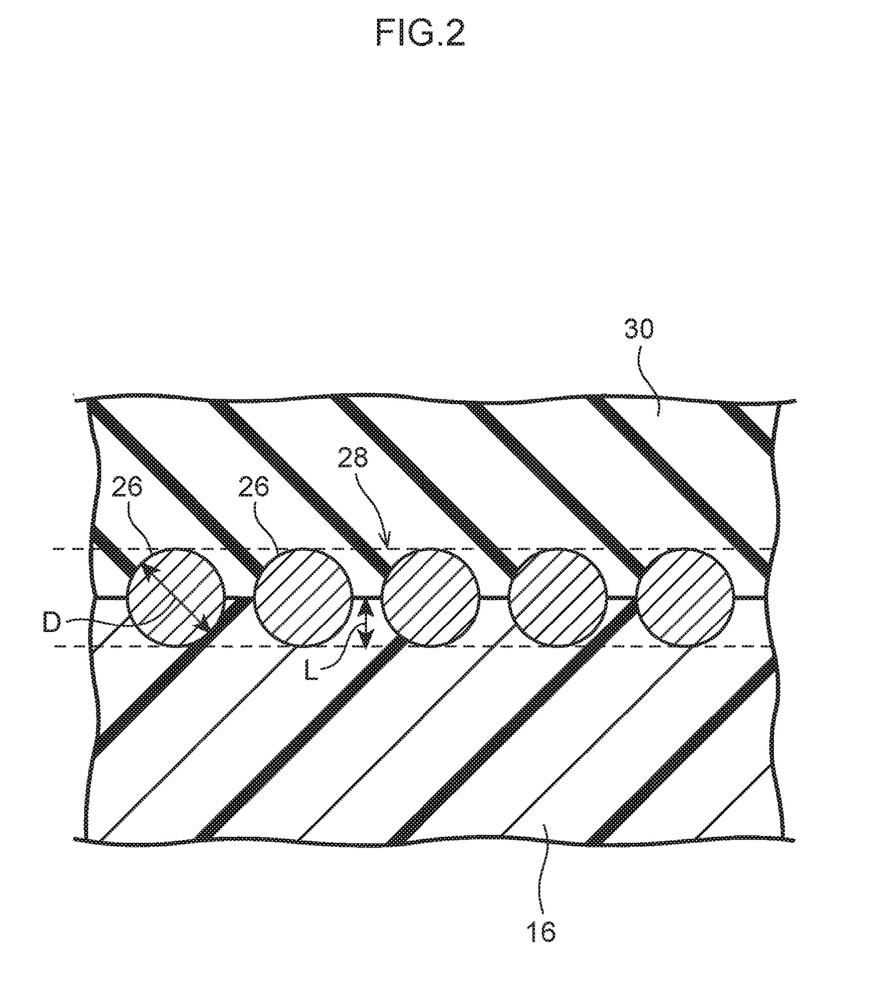
FIG. 2 is a cross-sectional view taken along a tire rotation axis that illustrates a state in which a reinforcing cord is embedded in a crown portion of a tire case of a tire according to a first embodiment.

The reinforcing cord layer 28 formed by the reinforcing cord 26 is described below with reference to FIG. 2. FIG. 2 is a cross-sectional view taken along the tire rotation axis, which illustrates a state in which the reinforcing cord is embedded in the crown portion of the tire case of the tire according to the first embodiment. As illustrated in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 indicated by the intermittent lines in FIG. 2. The part of the reinforcing cord 26 that is embedded in the crown portion 16 is in close contact with the resinous material forming a part or the whole of the crown portion 16 (the tire case 17). A monofilament (single filament) of a metal fiber, an organic fiber, or the like, or a multifilament (stranded filament) in which such fibers are stranded, such as a steel cord composed of stranded steel fibers, may be used as the reinforcing cord 26. In the present embodiment, a steel cord is used as the reinforcing cord 26.

The depth L of embedding in FIG. 2 illustrates the depth of embedding of the reinforcing cord 26 in the tire case 17 (the crown portion 16) along the tire rotation axis direction. The depth L of embedding of the reinforcing cord 26 in the crown portion 16 is preferably equal to or greater than $\frac{1}{5}$ of the diameter D of the reinforcing cord 26, and more preferably more than ½ of the diameter D of the reinforcing cord 26. It is most preferable that the entire reinforcing cord 26 is embedded in the crown portion 16. When the depth L of embedding of the reinforcing cord 26 is more than ½ of the diameter D of the reinforcing cord 26, the reinforcing cord 26 is difficult to drop off from the embedded portion due to the dimensions of the reinforcing cord 26. When the entire reinforcing cord 26 is embedded in the crown portion 16, the surface (the outer circumferential surface) becomes flat, whereby entry of air into an area around the reinforcing cord can be reduced even when a member is placed on the crown portion 16 in which the reinforcing cord 26 is embedded. The reinforcing cord layer 28 corresponds to a belt disposed on the outer circumferential surface of a carcass of a conventional pneumatic rubber tire.

As described above, the crown 30 is disposed on the tire-radial-direction outer circumferential side of the reinforcing cord layer 28. It is preferable that the same type of rubber as that used for conventional pneumatic rubber tires is used as the rubber used for the crown 30. A crown formed of another type of resinous material having higher wear resistance than that of the resinous material forming a part or the whole of the tire case 17 may be used, in place of the crown 30. In the crown 30, a crown pattern composed of plural grooves is formed on the contact surface that comes into contact with a road surface, similar to conventional pneumatic rubber tires. A method of manufacturing a tire according to the present embodiment is described below.

(Tire Case Forming Process)

First, tire case half parts are formed using a resinous material including the polyamide-based thermoplastic elastomer, as described above. The forming of these tire cases is preferably performed using injection molding. Then, the tire case half parts supported by thin metal support rings are aligned to face each other. Subsequently, a jointing mold, not illustrated in the drawings, is placed so as to contact the outer circumferential surface of a butt portion of the tire case half parts. The jointing mold is configured to pressurize a region at or around the joint portion (the butt portion) of the tire case half parts 17A with a predetermined pressure. Then, the pressure is applied to the region at or around the joint portion of the tire case half parts at a temperature equal to or higher than the melting point (or softening point) of the resinous material that forms a part or the whole of the tire case. When the joint portion of the tire case half parts is heated and pressurized by the jointing mold, the joint portion is melted, and the tire case half parts are fused with each other, as a result of which the members are integrated to form the tire case 17. Although the joint portion of the tire case half parts is heated using the jointing mold in the present embodiment, the invention is not limited thereto; heating of the joint portion may be carried out using, for example, a separately provided high frequency heater, or the tire case half parts may be bonded by softening or melting the joint portion, in advance, via application of hot air, irradiation with infrared radiation, or the like, and applying a pressure to the joint portion using the jointing mold.

(Reinforcing Cord Member Winding Process)

Figure 3:
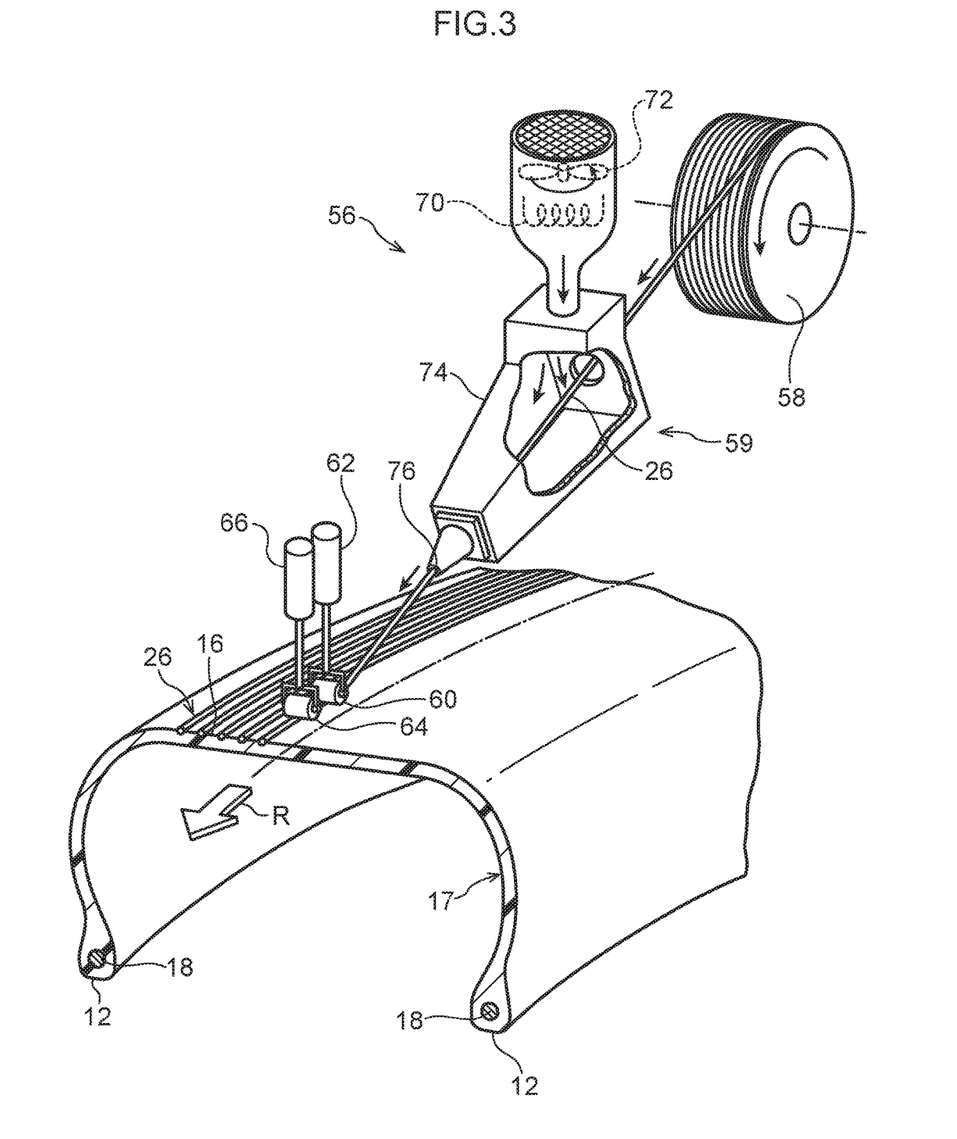
FIG. 3 is an explanatory diagram for explaining a process of embedding a reinforcing cord in a crown portion of a tire case using a cord heating device and rollers.

Next, a reinforcing cord member winding process is described with reference to FIG. 3. FIG. 3 is an explanatory diagram explaining an operation to embed the reinforcing cord in the crown portion of the tire case using a cord heating device and rollers. In FIG. 3, a cord feeding apparatus 56 includes: a reel 58 on which a reinforcing cord 26 is wound; a cord heating device 59 disposed at the cord conveying direction downstream side of the reel 58; a first roller 60 disposed at the reinforcing cord 26 conveying direction downstream side of the cord heating device 59; a first cylinder device 62 for moving the first roller 60 in directions in which the first rollers comes into contact with and get away from the outer circumferential surface of the tire; a second roller 64 disposed at the reinforcing cord 26 conveying direction downstream side of the first roller 60; and a second cylinder device 66 for moving the second roller 64 in directions in which the second roller comes into contact with and get away from the outer circumferential surface of the tire. The second roller 64 can be used as a cooling roller formed of metal. In the present embodiment, the surfaces of the first roller 60 and the second roller 64 are coated with a fluororesin (in the present embodiment, TEFLON (registered trademark)) with a view to reducing adhesion of the melted or softened resinous material. Although the cord feeding apparatus 56 is configured to have two rollers of the first roller 60 and the second roller 64 in the present embodiment, the present invention is not limited to this configuration, and the cord feeding apparatus may be configured to have only one of these rollers (that is, a single roller).

The cord heating device 59 includes a heater 70 and a fan 72 that generate hot air. The cord heating device 59 includes a heating box 74 into which hot air is supplied and in which the reinforcing cord 26 passes through the inside space thereof, and a discharge outlet 76 through which the heated reinforcing cord 26 is discharged.

In the present process, first, the temperature of the heater 70 of the cord heating device 59 is increased, and the air around the heater 70 heated by the heater 70 is sent to the heating box 74 by an air current generated by the rotation of the fan 72. Then, the reinforcing cord 26 drawn out from the reel 58 is fed to the inside of the heating box 74, of which the inner space is heated with hot air, whereby the reinforcing cord 26 is heated (for example, to increase the temperature of the reinforcing cord 26 to be approximately 100° C. to 200° C.). The heated reinforcing cord 26 passes through the discharge outlet 76, and is helically wound, with a constant tension, around the outer circumferential surface of the crown portion 16 of the tire case 17 rotating in the direction indicated by arrow R in FIG. 3. Here, as a result of the heated reinforcing cord 26 coming into contact with the outer circumferential surface of the crown portion 16, the resinous material at the contact portion is melted or softened, and at least a part of the heated reinforcing cord 26 is embedded in the outer circumferential surface of the crown portion 16. In this process, since the heated reinforcing cord 26 is embedded in the melted or softened resinous material, a state is achieved in which there are no gaps between the resinous material and the reinforcing cord 26, namely a close contact state. Accordingly, the incorporation of air into the portion in which the reinforcing cord 26 is embedded is reduced. By heating the reinforcing cord 26 to a temperature higher than the melting point (or softening point) of the resinous material of the tire case 17, the melting or softening of the resinous material in the portion contacting the reinforcing cord 26 is promoted. By employing the above process, embedding of the reinforcing cord 26 in the outer circumferential surface of the crown portion 16 is facilitated, and the incorporation of air can effectively be reduced.

The depth L of embedding of the reinforcing cord 26 can be adjusted by the heating temperature for the reinforcing cord 26, the tension acting on the reinforcing cord 26, the pressure applied by the first roller 60, and the like. In the present embodiment, the depth L of embedding of the reinforcing cord 26 is set to be equal to or greater than ⅕ of the diameter D of the reinforcing cord 26. The depth L of embedding of the reinforcing cord 26 is more preferably more than ½ of the diameter D of the reinforcing cord 26, and it is most preferable that the entire reinforcing cord 26 is embedded.

In this way, a reinforcing cord layer 28 is formed on the outer circumferential side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

Then, a belt-shaped vulcanized crown 30 is wound on the outer circumferential surface of the tire case 17 for one revolution, and the crown 30 is bonded to the outer circumferential surface of the tire case 17 using, for example, an adhesive. For example, precured crowns known thus far for use in retreaded tires may be used as the crown 30. The present process is a process similar to the process of bonding a precured crown to the outer circumferential surface of a casing of a retreaded tire.

A tire 10 can be completed by bonding a sealing layer 24 formed only of a vulcanized rubber to the bead portion 12 of the tire case 17 using, for example, an adhesive.

Although a configuration in which the reinforcing cord 26 is heated such that a portion of the surface of the tire case 17 that contacts the heated reinforcing cord 26 is melted or softened is adopted in the embodiment described above, the invention is not limited to this configuration. For example, instead of heating the reinforcing cord 26, a hot airflow generation device may be used to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in the first embodiment, the invention is not limited to this configuration, and a configuration in which the reinforcing cord 26 is directly heated by radiation heat (for example, infrared radiation) may be adopted.

Although a configuration in which a region at which the resinous material with the reinforcing cord 26 embedded therein is melted or softened is forcibly cooled with the second roller 64 formed of metal is adopted in the first embodiment, the invention is not limited to this configuration; a configuration in which cold airflow is directly applied to the region at which the resinous is melted or softened, to forcibly cool and solidify the region at which the resinous is melted or softened may also be adopted.

Although a configuration in which the reinforcing cord 26 is heated is adopted in the first embodiment, a configuration in which the outer circumference of the reinforcing cord 26 is coated with the same resinous material as that of the tire case 17, for example, may be adopted. In this case, by heating the coated resin along with the reinforcing cord 26 when the coated reinforcing cord is wound on the crown portion 16 of the tire case 17, incorporation of air during embedding the reinforcing cord in the crown portion 16 can effectively be reduced.

Helically winding the reinforcing cord 26 is easy from the viewpoint of manufacture. However, a method in which reinforcing cords 26 are provided such that reinforcing cords aligned in the width direction are discontinuous may also be contemplated.

The tire 10 in the first embodiment is what is referred to as a tubeless tire, in which an air chamber is formed between the tire 10 and the rim 20 by fitting the bead portions 12 to the rim 20. However, the invention is not limited to this configuration, and a complete tube shape may be adopted.

Further, the tire according to the invention may have a configuration in which a reinforcing cord member having a cord member covered with a resinous material is used, as illustrated in the second embodiment (FIGS. 4 and 5) of Japanese Patent Application Laid-open (JP-A) No. 2012-46030.

Although modes for carrying out the invention are described above with reference to embodiments, these embodiments are examples, and may be practiced with various modifications within a range not departing from the spirit of the invention. Of course, the protection scope of the invention is not limited to these embodiments.

EXAMPLES

The invention is more specifically described below by reference to examples. However the invention is not limited thereto.

Example 1

Synthesis of Hard Segment: PA12 (NYLON (Registered Trademark) 12)

39 g of 12-aminododecanoic acid, 530 g of aminododecanolactam and 108 g of dodecanedioic acid, which were manufactured by Aldrich, were added into a reaction vessel having a capacity of 2 L and equipped with a stirrer, a nitrogen gas inlet and a condensed water discharge port. The air inside the reaction vessel was sufficiently replaced by nitrogen, and then the temperature was raised to 280° C. and a reaction was allowed to proceed for 4 hours at an elevated pressure elevated by 0.6 MPa. After the pressure was relieved, a reaction was allowed to proceed for another 1 hour under nitrogen flow, whereby a white solid, which was a desired PA12 polymer having a number average molecular weight of about 1200, was obtained.

Synthesis of Polyamide Elastomer 200 of the PA12 (a polymer (HS) forming a hard segment), 3.6 g of PPG triamine (JEFFAMINE (registered trademark) T-403 manufactured by HUNTSMAN, which is a polymer (3SS) forming a soft segment, having three or more functional groups, and having a weight average molecular weight of 440), and 62 g of PPG diamine (JEFFAMINE (registered trademark) D-400 manufactured by HUNTSMAN, which is a polymer (2SS) forming a soft segment and having two functional groups) were mixed.

The mixture was stirred at 230° C. for 6 hours under nitrogen flow, and 1 g of IRGANOX1010 manufactured by BASF was added thereto, whereby a white polyamide elastomer was obtained. The obtained polyamide elastomer was shaped into pellets, and injection-molded at 220° C., thereby obtaining a sample piece. Various measurements were carried out using a sample obtained by stamping out a test piece from the sample piece.

Example 2

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 1. The charge amounts were changed such that the charge amount of the PA12 (HS) having a molecular weight of 1200 was 200 g, such that the charge amount of T-403 (3SS) was 7.0 g, and such that the charge amount of PPG diamine (2SS) was 57 g. A polyamide elastomer was obtained in the same manner as that in Example 1, except for the above points.

Example 3

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 1. The HS was changed to a PA12 having a molecular weight of 820. The charge amounts were changed such that the charge amount of PA12 (HS) having a molecular weight of 820 was 200 g, such that the charge amount of T-403 (3SS) was 10 g, and such that the charge amount of RT-1000 (2SS) was 209 g. A polyamide elastomer was obtained in the same manner as that in Example 1, except for the above points.

Example 4

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 1. The HS was changed to a PA6 having a molecular weight of 810. The charge amounts were changed such that the charge amount of PA6 (HS) having a molecular weight of 810 was 200 g, such that the charge amount of T-403 (3SS) was 10 g, and such that the charge amount of D-400 (2SS) was 84 g. A polyamide elastomer was obtained in the same manner as that in Example 1, except for the above points.

Example 5

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 1. The HS was changed to a PA6 having a molecular weight of 1860. The charge amounts were changed such that the charge amount of PA6 (HS) having a molecular weight of 1860 was 200 g, such that the charge amount of T-403 (3SS) was 2.3 g, and such that the charge amount of RT-1000 (2SS) was 100 g. A polyamide elastomer was obtained in the same manner as that in Example 1, except for the above points.

Example 6

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 1. The HS was changed to a PA6 having a molecular weight of 1860. The charge amounts were changed such that the charge amount of PA6 (HS) having a molecular weight of 1860 was 200 g, such that the charge amount of T-403 (3SS) was 4.5 g, and such that the charge amount of RT-1000 (2SS) was 92 g. Apolyamide elastomer was obtained in the same manner as that in Example 1, except for the above points.

Example 7

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 1. The HS was changed to a PA6 having a molecular weight of 1860. The charge amounts were changed such that the charge amount of PA6 (HS) having a molecular weight of 1860 was 200 g, such that the charge amount of T-403 (3SS) was 8.6 g, and such that the charge amount of RT-1000 (2SS) was 78 g. Apolyamide elastomer was obtained in the same manner as that in Example 1, except for the above points.

Example 8

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 1. The HS was changed to a PA6 having a molecular weight of 820. The charge amounts were changed such that the charge amount of PA6 (HS) having a molecular weight of 820 was 200 g, such that the charge amount of T-403 (3SS) was 4.5 g, and such that the charge amount of RT-1000 (2SS) was 92 g. Apolyamide elastomer was obtained in the same manner as that in Example 1, except for the above points.

Example 9

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 2. The HS was changed to a PA6 having a molecular weight of 1860. The charge amounts were changed such that the charge amount of PA6 (HS) having a molecular weight of 1860 was 200 g, such that the charge amount of T-3000 (3SS) was 31 g, and such that the charge amount of RT-1000 (2SS) was 92 g. Apolyamide elastomer was obtained in the same manner as that in Example 1, except for the above points.

Example 10

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 2. The HS was changed to a PA6 having a molecular weight of 1860. The charge amounts were changed such that the charge amount of PA6 (HS) having a molecular weight of 1860 was 200 g, such that the charge amount of T-5000 (3SS) was 51 g, and such that the charge amount of RT-1000

(2SS) was 92 g. A polyamide elastomer was obtained in the same manner as that in Example 1, except for the above points.

Example 11

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 2. The HS was changed to a PA6 having a molecular weight of 4000. The charge amounts were changed such that the charge amount of PA6 (HS) having a molecular weight of 4000 was 200 g, such that the charge amount of T-5000 (3SS) was 24 g, and such that the charge amount of RT-1000 (2SS) was 43 g. A polyamide elastomer was obtained in the same manner as that in Example 1, except for the above points.

Example 12

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 2. The HS was changed to a PA6 having a molecular weight of 1860. The charge amounts were changed such that the charge amount of PA6 (HS) having a molecular weight of 1860 was 200 g, such that the charge amount of T-403 (3SS) was 13 g, and such that the charge amount of RT-1000 (2SS) was 63 g. A polyamide elastomer was obtained in the same manner as that in Example 1, except for the above points.

Example 13

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 2. The HS was changed to a PA6 having a molecular weight of 810. The charge amounts were changed such that the charge amount of PA6 (HS) having a molecular weight of 810 was 200 g, such that the charge amount of EXCENOL 430 manufactured by Asahi Glass Co., Ltd. (3SS) was 10 g, such that the charge amount of EXCENOL 420 manufactured by Asahi Glass Co., Ltd. (2SS) was 84 g, and such that 1.5 g of $Zr(OBu)_4$ manufactured by Kanto Chemical Co., Inc was further added as a polymerization catalyst. A polyamide elastomer was obtained in the same manner as that in Example 1, except for the above points.

Example 14

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 3. The HS was changed to a PA12 having a molecular weight of 820. The charge amounts were changed such that the charge amount of PA12 (HS) having a molecular weight of 820 was 200 g, such that the charge amount of T-403 (3SS) was 50 g, and such that the charge amount of RT-1000 (2SS) was 75 g. The polymerization time was changed to 4 hours. A polyamide elastomer was obtained in the same manner as that in Example 1, except for the above points.

Example 15

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 3. The HS was changed to a PA6 having a molecular weight of 1500. The charge amounts were changed such that the charge amount of PA6 (HS) having a molecular weight of 1500 was 200 g, such that the charge amount of T-403 (3SS) was 23 g, and such that the charge amount of RT-1000 (2SS) was 53 g. The polymerization time was changed to 3.5 hours. A polyamide elastomer was obtained in the same manner as that in Example 1, except for the above points.

Example 16

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 3. The HS was changed to a PA612 having a molecular weight of 1500, which was synthesized according to the method described below. The charge amounts were changed such that the charge amount of PA612 (HS) having a molecular weight of 1500 was 200 g, such that the charge amount of T-403 (3SS) was 5.6 g, and such that the charge amount of RT-1000 (2SS) was 114 g. The polymerization temperature was changed to 240° C. A polyamide elastomer was obtained in the same manner as that in Example 1, except for the above points.

Example 16, in which PA612 was used, exhibited a superior balance among resistance to crack development, water absorbing property and heat resistance.

Synthesis of Hard Segment: PA612 (NYLON (Registered Trademark) 612)

213 g of dodecanedioic acid, 87 g of hexamethylenediamine and 100 g of purified water were added into a reaction vessel having a capacity of 2 L and equipped with a stirrer, a nitrogen gas inlet and a condensed water discharge port. The air inside the reaction vessel was sufficiently replaced by nitrogen, and then the temperature was raised to 280° C. and a reaction was allowed to proceed for 4 hours at an elevated pressure elevated by 0.6 MPa. After the pressure was relieved, a reaction was allowed to proceed for another 1 hour under nitrogen flow, and the reaction product was taken out of the vessel and subjected to Soxhlet extraction with ethanol for 24 hours, whereby a white solid, which was a desired PA612 polymer having a number average molecular weight of about 1500, was obtained.

Example 17

The polymer (HS) forming a hard segment, the polymer (3SS) forming a soft segment and having three or more functional groups, the polymer (2SS) forming a soft segment and having two functional groups, the ratio of 2SS to 3SS (molar ratio), and the ratio of hard segment HS to soft segment SS (mass ratio) were set as indicated in Table 3. A polyamide elastomer was prepared according to a method in which the monomer serving as a raw material for forming a hard segment and the soft segment (3SS and 2SS) were mixed and polymerized, instead of the method in which the PA6 (HS) forming a hard segment was polymerized in advance, and in which the PA6 (HS) and the soft segment (3SS and 2SS) were mixed for forming a polyamide elastomer by polymerization.

Specifically, 160 g of caprolactam, 12 g of dodecanedioic acid and 26 g of aminohexanoic acid, which were manufactured by Aldrich and were monomers serving as raw materials for a hard segment PA6, and 2.9 g of T-403 (3SS) and 124 g of RT-1000 (2SS), were mixed at once, and subjected to polymerization under the same conditions as those in the production of the polyamide elastomer in Example 1, as a result of which a polyamide elastomer was obtained.

Comparative Examples 1 to 3

The polymer (3SS) forming a soft segment and having three or more functional groups was not used. The polymer (HS) forming a hard segment, the polymer (2SS) forming a soft segment and having two functional groups, the ratio of 2SS to 3SS (molar ratio), the ratio of hard segment HS to soft segment SS (mass ratio), the weight average molecular weight, and the ratio of Mw80 to Mw20 were set as indicated in Table 2. A polyamide elastomer was obtained in the same manner as that in Example 1, except for the above points.

—Evaluations—

[Injection Moldability]

In the injection molding, grade A was assigned to samples capable of being shaped into a flat plate using a 15 t injection molding machine, grade B was assigned to samples having an inferior handleability (deficient metering) compared to that of grade A, and grade C was assigned to samples that exhibited deficient filling (high viscosity).

[Fittability to Rim]

A tire was produced using the polymer obtained in each of the Examples and the Comparative Examples, with reference to the first embodiment described above. Then, the tire was mounted on a rim. Grade A was assigned to a case in which air sealing was achieved, grade B was assigned to a case in which handleability at mounting on a rim was inferior due to hardness, and grade C was assigned to a case in which cracks occurred and/or air sealing was not achieved.

[Low-Loss Property]

A test piece having circular disk shape with a diameter of 8 mm that was stamped out from a 2 mm-thick sample piece was used for the measurement. After the test piece was moisture-controlled in an environment of 23° C. and a relative humidity of 50%, loss tangent (tan δ) was measured at a temperature of 30° C., a distortion of 1% and a frequency of 20 Hz using a viscoelasticity measuring instrument (manufactured by TA instruments). Grade A was assigned to a case in which the tan δ was 0.08 or less, grade B was assigned to a case in which the tan δ was from more than 0.08 to 0.12, and grade C was assigned to a case in which the tan δ was more than 0.12. The sample that exhibited the smallest loss among all the Examples and Comparative Examples was accompanied by the indication "(100)", the sample that exhibited the greatest loss was accompanied by the indication "(0)", and indices for the respective samples are indicated.

[Resistance to Crack Development]

The obtained sample was stamped out into a JIS-3 dumbbell shape, and a test sample in which a crack start point was provided, in advance, at the center of the sample was prepared. The test samples was subjected to repeated tensile stresses (17 Hz and a distortion set to 11%) using a servo pulser manufactured by Shimadzu Corporation. The number of times until the sample broke due to a developed crack was recorded, and evaluated according to the following criteria.

A: the sample broke at more than 1,000,000 times of repetitions

B: the sample broke at from more than 100,000 times of repetitions to 1,000,000 times of repetitions C: the sample broke at from more than 10,000 times of repetitions to 100,000 times of repetitions D: the sample broke at 10,000 or fewer repetitions

[Weather Resistance (Resistance to Hydrolysis)]

The obtained injection-molded sample was left to stand in a constant-temperature constant-humidity chamber at 80° C. and a relative humidity of 95%, and the molecular weight of the sample was measured after the elapse of 1000 hours. Grade A was assigned to a case in which the molecular weight measured after the elapse of 1000 hours was greater than 90% of the molecular weight before test, grade B was assigned to a case in which the molecular weight measured after the elapse of 1000 hours was from more than 80% to 90% of the molecular weight before test, and grade C was assigned to a case in which the molecular weight measured after the elapse of 1000 hours was 80% or less of the molecular weight before test.

TABLE 1

|  | Example 1 | Example 2 | Example 3 | Example 4 | Example 5 | Example 6 | Example 7 | Example 8 |
|---|---|---|---|---|---|---|---|---|
| HS | PA12 | | | | PA6 | | | |
| Bifunctional SS (2SS) | PPG Diamine | PPG Diamine | PPG/PTMG/PPG Diamine | PPG Diamine | | PPG/PTMG/PPG Diamine | | |
| Tri- or higher-functional SS (3SS) | T-403 | | | | | | | |
| 2SS/3SS Ratio (Molar Ratio) | 95/5 | 90/10 | 90/10 | 90/10 | 95/5 | 90/10 | 80/20 | 70/30 |
| HS/SS Ratio (Mass Ratio) | 75/25 | 75/25 | 45/55 | 67/33 | 65/35 | 65/35 | 65/35 | 45/55 |
| Weight Average Molecular Weight | 158,000 | 216,000 | 472,000 | 486,000 | 278,000 | 526,000 | 612,000 | 720,000 |
| Mw80/Mw20 Ratio | 3.78 | 5.02 | 8.17 | 7.07 | 7.15 | 7.29 | 11.2 | 14.8 |
| Injection Moldability | A | A | A | A | A | A | A | B |
| Fittability to Rim | A | A | A | A | A | A | A | A |
| Low-loss Property | A (51) | A (52) | A (98) | A (62) | A (64) | A (67) | A (70) | A (100) |
| Resistance to Crack Development | A | A | A | A | A | A | A | A |
| Weather Resistance (Resistance to Hydrolysis) | A | A | A | B | A | A | A | A |

TABLE 2

|  | Example 9 | Example 10 | Example 11 | Example 12 | Example 13 | Comparative Example 1 | Comparative Example 2 | Comparative Example 3 |
|---|---|---|---|---|---|---|---|---|
| HS | | | PA6 | | | PA12 | PA6 | |
| Bifunctional SS (2SS) | | PPG/PTMG/PPG Diamine | | | PPG Diol | PPG/PTMG/PPG Diamine | | |
| Tri- or higher-functional SS (3SS) | T-3000 | T-5000 | | T-403 | EXCENOL 430 | (Not Added) | | |
| 2SS/3SS Ratio (Molar Ratio) | 90/10 | 90/10 | 90/10 | 68/32 | 90/10 | 100/0 | 100/0 | 00/0 |
| HS/SS Ratio (Mass Ratio) | 65/35 | 65/35 | 80/20 | 65/35 | 67/33 | 45/55 | 95/5 | 45/55 |
| Weight Average Molecular Weight | 358,000 | 321,000 | 301,000 | 752,000 | 239,000 | 141,000 | 141,000 | 136,000 |
| Mw80/Mw20 Ratio | 6.88 | 6.38 | 5.98 | 15.6 | 5.57 | 2.89 | 2.59 | 2.77 |
| Injection Moldability | A | A | A | B | A | B | B | B |
| Fittability to Rim | A | A | A | B | A | C | C | C |
| Low-loss Property | A (65) | A (65) | A (50) | A (72) | A (53) | A (71) | A (0) | A (92) |
| Resistance to Crack Development | A | A | B | B | A | B | D | A |
| Weather Resistance (Resistance to Hydrolysis) | A | A | A | A | B | A | A | A |

TABLE 3

|  | Example 14 | Example 15 | Example 16 | Example 17 |
|---|---|---|---|---|
| HS | PA12 | PA6 | PA612 | PA6 |
| Bifunctional SS (2SS) | | PPG/PTMG/PPG Diamine | | |
| Tri- or higher-functional SS (3SS) | | T-403 | | |
| 2SS/3SS Ratio (Molar Ratio) | 40/60 | 50/50 | 90/10 | 95/5 |
| HS/SS Ratio (Mass Ratio) | 45/55 | 60/40 | 60/40 | 60/40 |
| Weight Average Molecular Weight | 763,000 | 869,000 | 563,000 | 254,000 |
| Mw80/Mw20 Ratio | 16.1 | 21 | 7.33 | 2.9 |
| Injection Moldability | B | B | A | A |
| Fittability to Rim | A | A | A | A |
| Low-loss Property | A (100) | A (100) | A (69) | A (68) |
| Resistance to Crack Development | A | A | A | B |
| Weather Resistance (Resistance to Hydrolysis) | A | A | A | A |

The ingredients indicated in Tables 1 to 3 are as follows.

—Bifunctional Polymer Forming Soft Segment—

PPG Diamine: JEFFAMINE (registered trademark) D-400 (tradename, manufactured by HUNTSMAN)

PPG/PTMG/PPG Diamine (a terpolymer including a structural unit derived from polytetramethylene ether glycol (PTMG) and a structural unit derived from polypropylene glycol (PPG)): JEFFAMINE (registered trademark) RT-1000 (tradename, manufactured by HUNTSMAN)

PPG Diol: EXCENOL 420 (tradename) manufactured by Asahi Glass Co., Ltd.

—Tri- or Higher-Functional Polymer for Soft Segment—

T-403: JEFFAMINE (registered trademark) T-403 manufactured by HUNTSMAN, which is a PPG triamine having an average molecular weight of 440

T-3000: JEFFAMINE (registered trademark) T-3000 manufactured by HUNTSMAN, which is a PPG triamine having an average molecular weight of 3000

T-5000: JEFFAMINE (registered trademark) T-5000 manufactured by HUNTSMAN, which is a PPG triamine having an average molecular weight of 5000

EXCENOL 430: PPG triol having an average molecular weight of 400, manufactured by Asahi Glass Co., Ltd.

—Polymer for Hard Segment—

PA12: the PA12 (NYLON (registered trademark) 12) synthesized in Example 1

PA6: the PA6 manufactured by the below-described method (NYLON (registered trademark) 6)

(Synthesis of Hard Segment: PA6 (NYLON® 6))

540 g of caprolactam, 109 g of dodecanedioic acid and 42 g of aminohexanoic acid, which were manufactured by Aldrich, were added into a reaction vessel having a capacity of 2 L and equipped with a stirrer, a nitrogen gas inlet and a condensed water discharge port. The air inside the reaction vessel was sufficiently replaced by nitrogen, and then the temperature was raised to 280° C. and a reaction was allowed to proceed for 4 hours at an elevated pressure elevated by 0.6 MPa. After the pressure was relieved, a reaction was allowed to proceed for another 1 hour under nitrogen flow, and a process of washing with water was performed, whereby a white solid, which was a desired PA6 polymer having a number average molecular weight of about 810, was obtained.

PA612: PA612 synthesized in Example 16 (NYLON (registered trademark) 612)

The disclosure of Japanese Patent Application No. 2014-203500 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

EXPLANATION OF REFERENCE CHARACTERS

10: tire
12: bead portion

16: crown portion (outer circumferential portion)
17: tire case (tire frame)
18: bead core
20: rim
21: bead sheet
22: rim flange
24: sealing layer (sealing portion)
26: reinforcing cord (reinforcing cord member)
28: reinforcing cord layer
30: crown
D: the diameter of the reinforcing cord (the diameter of the reinforcing cord member)
L: the depth of embedding of the reinforcing cord (the depth of embedding of the reinforcing cord member)

The invention claimed is:

1. A circular tire frame comprising a resinous material including a polyamide-based thermoplastic elastomer, the polyamide-based thermoplastic elastomer being a copolymer formed by polymerization of at least a polymer (HS) forming a hard segment and a polymer forming a soft segment, the polymer forming a soft segment including a polymer (3SS) having three or more functional groups,
wherein the polymer forming a soft segment further includes a polymer (2SS) having two functional groups, and a proportion of the polymer (3SS) to a total amount of the polymer (3SS) and the polymer (2SS) is from 1% by mol to 30% by mol.

2. The tire frame according to claim 1, wherein the functional groups contained in the polymer (3SS) are amino groups.

3. The tire frame according to claim 1, wherein, in the polyamide-based thermoplastic elastomer, a ratio (Mw80/Mw20) of a molecular weight (Mw80) at a 80% cumulative weight to a molecular weight (Mw20) at a 20% cumulative weight is from 3 to 20,
wherein the molecular weight at 20% cumulative weight (Mw20) refers to a molecular weight at which a cumulative value of molecular weights of molecules of the polyamide-based polymer as measured by gel permeation chromatography (GPC) accumulated from the smaller weight side becomes 20%, and the molecular weight at 80% cumulative weight (Mw80) refers to a molecular weight at which a cumulative value of the molecular weights of molecules of the polyamide-based polymer as measured by GPC accumulated from the smaller weight side becomes 80%.

4. A tire comprising the tire frame according to claim 1.

5. The tire frame according to claim 1, wherein a content of the polyamide-based thermoplastic elastomer with respect to a total amount of the resinous material is 30% by mass or more.

6. The tire frame according to claim 1, wherein a mass ratio of hard segment to soft segment is in a range of from 45/55 to 80/20.

7. The tire frame according to claim 1, wherein a weight average molecular weight of the polyamide-based thermoplastic elastomer is from 10,000 to 700,000.

8. The tire frame according to claim 1, wherein a melting point or softening point of the resinous material is from 100° C. to 350° C.

9. The tire frame according to claim 1, wherein a tensile strength at yield of the resinous material is 5 MPa or more.

10. The tire frame according to claim 1, wherein a tensile elongation at yield of the resinous material is 10% or more.

* * * * *